(No Model.) 2 Sheets—Sheet 1.

J. DAY.
GAS ENGINE.

No. 544,214. Patented Aug. 6, 1895.

Witnesses:—
H. K. Boulter
C. L. Northup

Inventor:—
Joseph Day
By Wm E. Boulter,
Attorney (No Model.) 2 Sheets—Sheet 2.

J. DAY.
GAS ENGINE.

No. 544,214. Patented Aug. 6, 1895.

Witnesses:-
H. K. Boulter
C. T. Northup

Inventor:
Joseph Day
By Wm. E. Boulter
Attorney.

UNITED STATES PATENT OFFICE.

JOSEPH DAY, OF BATH, ENGLAND.

GAS-ENGINE.

SPECIFICATION forming part of Letters Patent No. 544,214, dated August 6, 1895.

Application filed March 8, 1894. Serial No. 502,866. (No model.) Patented in England April 14, 1891, No. 6,410; in France October 19, 1891, No. 216,842; in Italy December 31, 1891, XXV, 30,618; in Switzerland June 3, 1892, No. 5,493; in Norway June 7, 1892, No. 2,778; in Spain June 15, 1892, No. 13,340; in Victoria July 18, 1892, No. 9,803; in New South Wales July 20, 1892, No. 3,872; in South Australia July 21, 1892, No. 2,268; in Queensland July 23, 1892, No. 2,119; in West Australia July 26, 1892, No. 355, and in New Zealand August 3, 1892, No. 5,688.

*To all whom it may concern:*

Be it known that I, JOSEPH DAY, engineer, a subject of the Queen of Great Britain, residing at Spring Gardens, Bath, in the county of Somerset, England, have invented new and useful Improvements in Gas-Engines, (for which I have obtained Letters Patent in the following countries: Great Britain, No. 6,410, bearing date April 14, 1891; France, No. 216,842, bearing date October 19, 1891; Italy, No. 30,618, Vol. XXV, bearing date December 31, 1891; Spain, No. 13,340, bearing date June 15, 1892; Norway, No. 2,778, bearing date June 7, 1892; Switzerland, No. 5,493, bearing date June 3, 1892; New South Wales, No. 3,872, bearing date July 20, 1892; Victoria, No. 9,803, bearing date July 18, 1892; New Zealand, No. 5,688, bearing date August 3, 1892; South Australia, No. 2,268, bearing date July 21, 1892; Queensland, No. 2,119, bearing date July 23, 1892, and West Australia, No. 355, bearing date July 26, 1892,) of which the following is a specification.

According to my invention I construct an engine capable of being actuated either by an explosive mixture of gas and air or by the ignition of an explosive vapor, and by my construction, hereinafter to be described, I produce a gas-engine in which eccentrics, cams, valve-rods, and other positively-actuated gear are dispensed with.

Figure 1:
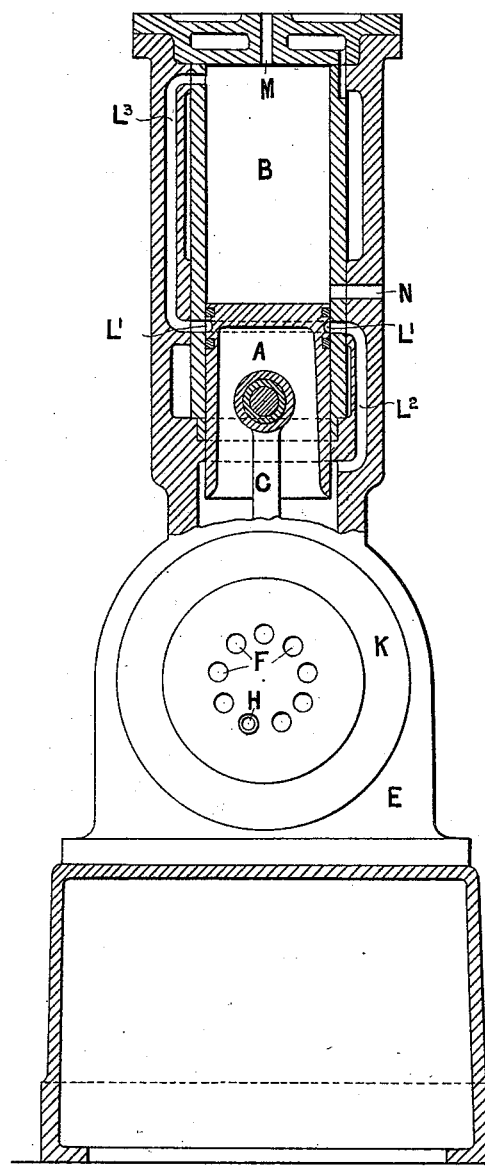
Figure 2:
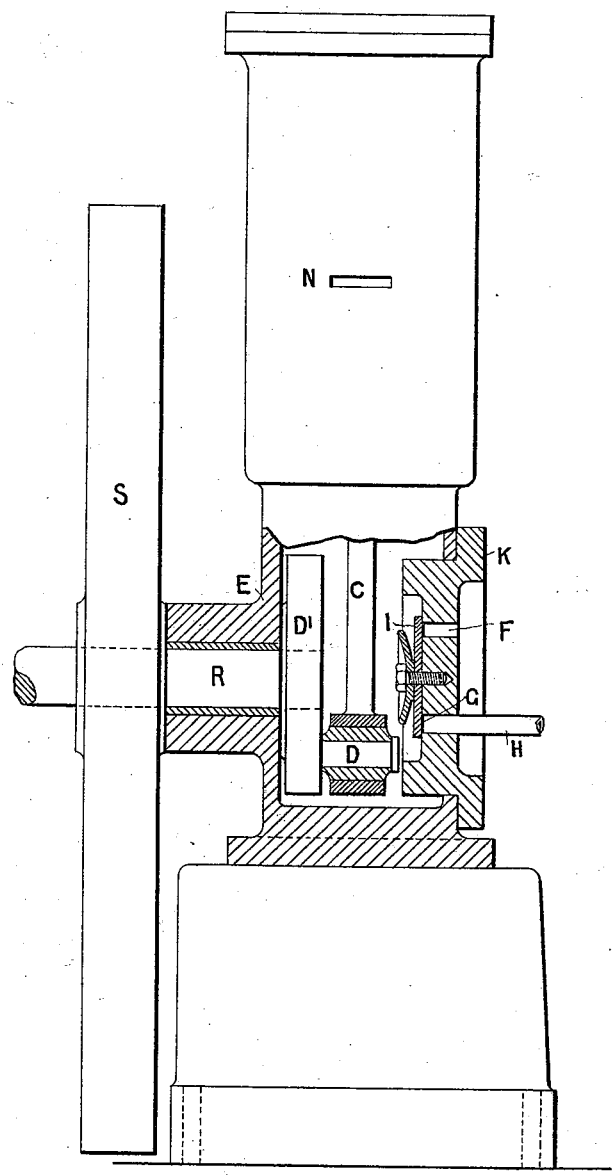

Figure 1 is an end view, partly in section, of a gas or vapor engine of the vertical inverted type in which the crank works in an inclosed space in the framework. Fig. 2 is a side view, partly in section.

Referring to the drawings, the plunger or piston A reciprocates in the jacketed cylinder B, which is mounted over and connected by a connecting-rod C to the crank-pin D, which latter is mounted on the crank or crank-disk D', keyed onto the crank-shaft R, having fly-wheel S. The air and gas are drawn in from below through the casing, forming the admission-chamber E, respectively, by air-ports F communicating to the outer air and gas-port G leading from the gas-supply pipe H, and a single disk or other suitable valve I does duty for the admission of both air and gas. This valve I may, as shown, be suitably mounted on a cover K, which is fixed onto the casing forming the chamber E, by bolts or otherwise, to allow of the whole valve and its seating to be removed when desired for renewal, adjustment, or cleaning.

Although I have only shown one form of valve I for the admission of air and gas, it is evident that any suitable construction may be used, and, if desired, a separate valve may be used for the air and another for the gas admission.

The air and gas, as described, enter by the valve I during the early portion of the up-stroke, and by the revolution of the crank-disk D' and crank D and movement of the connecting-rod are intimately mixed. The explosive mixture is conveyed into the upper part of the cylinder at the early part of the up-stroke by the passages $L^2$ and $L^3$ and annular groove L' in the plunger, whereupon the compression of the mixture above begins, owing to the groove L' in the plunger ceasing to register with the ports of the passages $L^2$ and $L^3$, and thus closing automatically the connection between the upper and lower parts of the cylinder. The ignition then takes place by any suitable igniting device having connection with the interior of the cylinder by a pipe M, and the plunger A is forced down until the exhaust-port N is uncovered thereby, and the majority of the products of combustion escape, while previous to such exhaust a certain amount of compression has been given to the mixture of air and gas below in the chamber E in such manner that, as aforesaid, as soon as the exhaust has taken place the explosive mixture passes by the passage $L^2$, groove L', in the piston or plunger A, and by the other passage $L^3$ into the upper part of the cylinder. By this means I attain that the explosive mixture reaches the upper part of the cylinder and away from the exhaust-port, so that the incoming charge does not escape thereby and cause a waste.

By regulating the size of the exhaust-port orifice I am enabled to leave more or less of the products of combustion in the cylinder at the end of the downstroke, as desired. The cubical contents of the inclosed lower chamber, and the cylinder should bear such relation to one another that on the charge being delivered into the cylinder from the lower chamber E both sides of the plunger should be at or about atmospheric pressure. Lubrication of the working parts and the keeping cool of the same are attained by permitting one or more of such parts to move or impinge against oil or water, or a mixture of both, in the bottom of chamber E. The speed of the engine may be governed by means of any suitable governing device acting on the gas-supply or otherwise.

Although I have shown these engines of the vertical inverted type it is evident that, if desired, they may be constructed of a non-inverted type or even horizontal. Two or more of these engines may be connected to the same shaft and on the same framework or bed-plate when desired. The engine or engines may be reversed by merely stopping the same and starting in the opposite direction. The absence of eccentrics, cams, valve-rods, and other gear and of valves in passages, valve-chests, or conduits outside of the cylinder greatly simplifies the construction of the engine, the ease of working it, and the facility with which it may be adjusted or cleaned. There is, further, no fear of escape of gas into the outer air.

What I claim as my invention, and desire to secure by Letters Patent, is—

1. In a gas engine, the combination of a cylinder and a piston therein, the said cylinder being divided by the piston into a combustion chamber on one side and a compression chamber on the other side, with passages $L^2$ and $L^3$, the said piston being provided with an annular groove adapted to open communication between the passages $L^2$ and $L^3$ at a given time in the stroke of the piston, substantially as set forth.

2. In a gas engine, the combination of a cylinder having an exhaust port and a piston therein, the said cylinder being divided by the piston into an explosion chamber, B, on one side, and a compression chamber, E, on the other, and two passages $L^2$, $L^3$, one communicating with the outer end of the chamber E and the other with the outer end of the chamber B, the other ends of the passages $L^2$ $L^3$ being covered by the piston and the said piston being provided with a groove adapted to connect the said ends of the passages $L^2$, $L^3$, with separate air and gas ports leading into the chamber, E, and a disk valve, I, secured to the inside of the chamber, so that its free edges cover both air and gas ports, the said disk valve being adapted to be automatically opened by the suction of the piston, and to close over the ports by the compression action of the piston, all substantially as set forth.

JOSEPH DAY.

Witnesses:
WM. E. BOULTER,
H. B. WILLSON.